US012602308B1

(12) United States Patent
Eati et al.

(10) Patent No.: US 12,602,308 B1
(45) Date of Patent: Apr. 14, 2026

(54) LLM-ASSISTED HIERARCHICAL CODE REVIEW SYSTEM

(71) Applicant: U.S. Bancorp, National Association, Minneapolis, MN (US)

(72) Inventors: Kameswara Eati, Cary, NC (US); Manohar Tallapaneni, Plano, TX (US); Sherin Mathews, Fremont, CA (US); Giacomo Domeniconi, New York, NY (US)

(73) Assignee: U.S. Bancorp, National Association, Minneapolis, MN (US)

( * ) Notice: Subject to any disclaimer, the term of this patent is extended or adjusted under 35 U.S.C. 154(b) by 0 days.

(21) Appl. No.: 19/319,337

(22) Filed: Sep. 4, 2025

(51) Int. Cl.
    *G06F 11/3604*     (2025.01)
    *G06F 8/71*       (2018.01)
    *G06N 5/025*     (2023.01)

(52) U.S. Cl.
    CPC ............ *G06F 11/3604* (2013.01); *G06F 8/71* (2013.01); *G06N 5/025* (2013.01)

(58) Field of Classification Search
    CPC ......... G06F 11/3604; G06F 8/71; G06N 5/01; G06N 5/025
    See application file for complete search history.

(56) References Cited

U.S. PATENT DOCUMENTS

| | | | | |
|---|---|---|---|---|
| 11,474,812 B1 * | 10/2022 | Anderson | ................. | G06F 8/60 |
| 11,914,993 B1 * | 2/2024 | Garg | .......................... | G06F 8/77 |
| 12,393,597 B1 * | 8/2025 | Rolland | ............ | G06F 16/24578 |
| 12,511,322 B1 * | 12/2025 | Zhang | ................. | G06F 16/3347 |
| 2024/0104479 A1 * | 3/2024 | Bansal | ...................... | G06F 8/71 |
| 2025/0244964 A1 * | 7/2025 | Mystetskyi | .............. | G06F 8/65 |

\* cited by examiner

*Primary Examiner* — Marina Lee
(74) *Attorney, Agent, or Firm* — FOLEY & LARDNER LLP

(57) ABSTRACT

The present disclosure provides a computer-implemented method for automated code review, comprising receiving a code change request associated with a hierarchical organizational structure having multiple organizational levels, identifying a hierarchical position within the organizational structure corresponding to the code change request, retrieving a plurality of code review rules from a hierarchical knowledge base, wherein the hierarchical knowledge base stores code review rules organized according to the hierarchical organizational structure, and wherein the plurality of code review rules includes rules from multiple organizational levels of the hierarchical organizational structure, applying the plurality of code review rules to the code change request using a large language model to generate code review feedback, and providing the code review feedback for the code change request. The hierarchical knowledge base may be implemented using a retrieval-augmented generation system that stores organizational standards, best practices, and team-specific customizations in a vector database organized according to the hierarchical organizational structure.

12 Claims, 10 Drawing Sheets

600

602 — Receive merge request

604 — Determine organizational hierarchy position

606 — Access retrieval-augmented generation module

608 — Generate automated code review comments

610 — Transmit comments to code repository interface

700

702 — Obtain code submission for review

704 — Identify hierarchical classification

706 — Retrieve hierarchical code review criteria

708 — Process code using AI model

710 — Generate review recommendations

712 — Output recommendations for workflow integration

LLM-ASSISTED HIERARCHICAL CODE REVIEW SYSTEM

BACKGROUND

Software development teams rely heavily on code review processes to maintain code quality, ensure adherence to coding standards, and identify potential security vulnerabilities or performance issues before code is merged into production systems. Traditional code review workflows typically involve manual inspection by peer developers, where reviewers examine proposed code changes, provide feedback, and suggest improvements based on their expertise and understanding of project requirements.

The manual nature of conventional code review processes presents several challenges for development organizations. Reviewers must invest considerable time understanding code changes, analyzing their impact on existing systems, and providing comprehensive feedback. This process can create bottlenecks in development workflows, particularly when senior developers are responsible for reviewing multiple code submissions simultaneously. The quality and consistency of reviews may vary depending on the reviewer's availability, expertise, and familiarity with specific coding standards or organizational practices.

Modern software development environments often involve complex organizational structures with multiple teams, departments, and hierarchical levels of coding standards and best practices. Different teams may have distinct coding conventions, security requirements, or architectural patterns that must be considered during the review process. Managing and applying these varied standards consistently across large organizations can be challenging, particularly when teams operate with different levels of autonomy while still needing to adhere to overarching organizational guidelines.

The increasing complexity of software systems and the growing emphasis on rapid development cycles have intensified the need for more efficient and scalable code review solutions. Development teams seek approaches that can reduce the time and effort associated with manual reviews while maintaining or improving the quality and thoroughness of the review process. Additionally, there is growing interest in leveraging artificial intelligence and machine learning technologies to assist with various aspects of software development, including code analysis and review automation.

Recent advances in large language models and natural language processing have opened new possibilities for automating aspects of code review processes. These technologies can potentially analyze code changes, understand context, and provide relevant feedback based on learned patterns from historical code reviews and established coding practices. However, effectively applying these technologies to real-world development environments requires careful consideration of organizational structures, team-specific requirements, and the integration of various knowledge sources and coding standards.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a computer-implemented method for automated code review is provided. The method comprises receiving a code change request associated with a hierarchical organizational structure having multiple organizational levels. The method identifies a hierarchical position within the organizational structure corresponding to the code change request. The method retrieves a plurality of code review rules from a hierarchical knowledge base, wherein the hierarchical knowledge base stores code review rules organized according to the hierarchical organizational structure, and wherein the plurality of code review rules includes rules from multiple organizational levels of the hierarchical organizational structure. The method applies the plurality of code review rules to the code change request using a large language model to generate code review feedback. The method provides the code review feedback for the code change request.

According to other aspects of the present disclosure, the computer-implemented method includes one or more of the following features. Identifying the hierarchical position comprises extracting a card identifier from the code change request, and the card identifier corresponds to a specific application within the hierarchical organizational structure. The hierarchical organizational structure comprises a digital banking ecosystem having multiple organizational levels including a digital level, a domain level, and an application level. Retrieving the plurality of code review rules comprises starting at a lowest hierarchical level corresponding to the identified hierarchical position, retrieving code review rules specific to the lowest hierarchical level, traversing upward through parent levels of the hierarchical organizational structure, and retrieving additional code review rules from each parent level. The code review rules from different organizational levels are applied sequentially to generate separate sets of code review comments, and the code review feedback includes an identification of which organizational level generated each code review comment. The hierarchical knowledge base is implemented using a retrieval-augmented generation (RAG) system that stores organizational standards, best practices, and team-specific customizations in a vector database organized according to the hierarchical organizational structure. Applying the plurality of code review rules comprises using an orchestration engine to coordinate multiple interactions with the large language model, wherein each interaction applies code review rules from a different organizational level of the hierarchical organizational structure.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

FIG. 10 illustrates an example machine learning framework that techniques described herein may benefit from.

DETAILED DESCRIPTION

Figure 1:
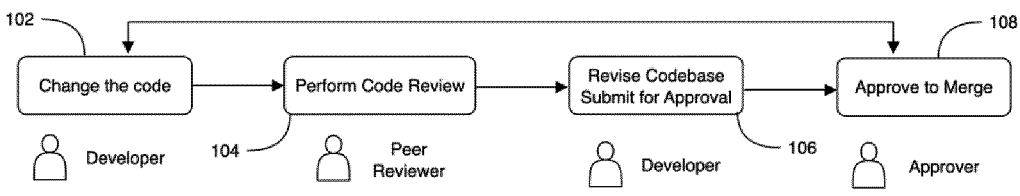
FIG. 1 illustrates a code review workflow process.

The following description sets forth exemplary aspects of the present disclosure. It should be recognized, however, that such description is not intended as a limitation on the scope of the present disclosure. Rather, the description also encompasses combinations and modifications to those exemplary aspects described herein.

The present disclosure relates to an LLM-assisted code review system that leverages hierarchical organizational structures and retrieval-augmented generation technology to automate and enhance code review processes. Traditional code review workflows in enterprise environments often suffer from bottlenecks, inconsistencies, and delays that impact development velocity and software quality. Manual code review processes typically involve developers submitting code changes and waiting for feedback from reviewers who manage multiple review requests simultaneously. This approach leads to extended wait times, rushed reviews under deadline pressure, and inconsistent application of coding standards across different teams and organizational levels.

The disclosed system addresses these challenges by implementing an automated code review approach that incorporates organizational hierarchy into the review process. Rather than applying generic code review rules uniformly across all code submissions, the system recognizes that different organizational levels, domains, and applications within an enterprise have distinct coding standards, compliance requirements, and best practices. For example, a financial services organization has enterprise-wide security standards, domain-specific regulations for payment processing, and application-specific architectural patterns that all apply to a single code submission.

The system utilizes retrieval-augmented generation technology to create a hierarchical knowledge base that stores code review rules, standards, and best practices organized according to the organizational structure. This approach enables the system to apply multiple layers of code review criteria to a single code submission, starting from the most specific application-level rules and traversing upward through domain-level and enterprise-level standards. The hierarchical approach ensures that code reviews incorporate all applicable organizational requirements while maintaining the context and specificity needed for different parts of the organization.

Large language models serve as the processing engine for applying the retrieved code review rules to submitted code changes. The system coordinates multiple interactions with the language models, where each interaction applies code review criteria from a different organizational level. This multi-layered approach generates comprehensive code review feedback that identifies which organizational level contributed each review comment, providing developers with clear context about the source and rationale for each recommendation. The automated system processes code submissions across multiple programming languages and development frameworks while maintaining consistency in the application of organizational standards and best practices.

Referring to FIG. 1, a traditional code review workflow process demonstrates the sequential stages and performance characteristics of manual code review operations in enterprise development environments. The workflow begins with a developer performing a "Code the Change" step 102, where code modifications are implemented according to project requirements. Following the initial coding phase, the process transitions to a "Perform Code Review" step 104 conducted by a peer reviewer who examines the submitted code changes for compliance with coding standards, security considerations, and functional correctness. The workflow continues with a "Review Codebase" step 106 where the developer submits the reviewed code for approval, followed by an "Approve to Merge" step 108 completed by an approver who provides final authorization for code integration.

The performance metrics associated with this traditional workflow reveal timing and coverage challenges that impact development efficiency. An average days of 1.45 represents the typical duration for completing individual code review cycles, while enterprise days 8.21 indicates the extended timeframes experienced in larger organizational contexts during a quarter. These timing metrics demonstrate the variability in review completion times across different organizational scales and complexity levels. Additionally, a percentage value 55 indicates that approximately fifty-five percent of merged merge requests undergo some form of code review, revealing gaps in review coverage that affect code quality and compliance adherence.

The workflow incorporates multiple communication and verification stages between the primary review steps. Between the initial code change (step 102) and peer review phases (step 104), the process includes screening reviews, troubleshooting activities, and potential rework cycles that extend the overall review duration. Information exchange occurs between developers and reviewers through various communication paths, as indicated by directional arrows showing the flow of feedback and approval decisions. After the review codebase stage (step 106), a verification step precedes final approval to merge (step 108), providing an additional quality gate before code integration into the main repository.

The linear progression through these workflow stages assigns specific responsibilities to different roles within the development organization. Developers bear responsibility for implementing code changes and addressing reviewer feedback, while peer reviewers conduct technical assessments and provide improvement recommendations. Approvers serve as final gatekeepers who authorize code merges based on review outcomes and organizational policies. The workflow demonstrates how manual processes create bottlenecks when senior-level reviewers manage multiple review requests simultaneously, leading to delays in the approval pipeline and rushed reviews under deadline pressure.

The traditional code review system encompasses tools for describing changes, reviewing code, suggesting improvements, and updating changelogs, though these functions typically require manual intervention and coordination. Change description activities involve developers documenting the purpose and scope of code modifications, while code review processes require reviewers to manually examine code against established standards and best practices. Improvement suggestions emerge from reviewer analysis and experience, and changelog updates depend on developer diligence in maintaining project documentation. These manual processes contribute to the timing variations and coverage gaps reflected in the performance metrics, highlighting opportunities for automation and systematic enhancement of the review workflow.

Figure 2:
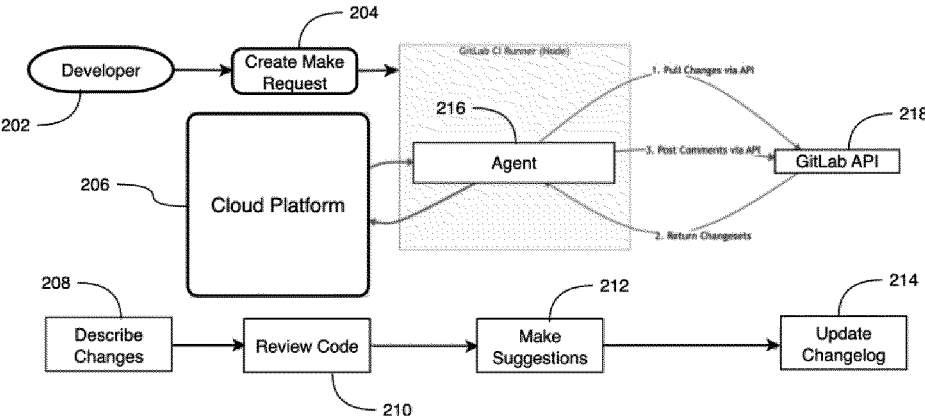
FIG. 2 depicts a system architecture diagram for an automated code review system, according to aspects of the present disclosure.

Referring to FIG. 2, a system architecture demonstrates a comprehensive integration framework that connects developer interfaces with cloud-based processing capabilities and automated code review tools. The architecture begins with a developer interface 202 that enables users to create merge requests 204 within their development environment. The system incorporates a GitLab CI/CD pipeline integration that functions as a plugin supporting Shield Pipeline-based continuous integration workflows. This integration allows the automated code review system to intercept and process merge requests as part of the standard development pipeline, ensuring that code review automation occurs seamlessly within existing developer workflows without requiring significant changes to established practices.

The cloud infrastructure components center around a cloud platform environment 206 that provides the computational and security framework for processing code review requests. Within the cloud platform tenant, the system connects with AI services to ensure system-level security architecture for sensitive development processes. This connection enables the system to leverage advanced language processing capabilities while maintaining the stringent security requirements typical of financial services organizations. The cloud platform environment also includes container execution capabilities that run command-line interface operations, interfacing with GitLab runner nodes via a GitLab API 218 to coordinate the execution of automated review processes within the continuous integration pipeline.

The system architecture incorporates multiple communication pathways that facilitate data exchange between different components. API-based interactions enable the system to pull code changes from repositories, process those changes through various analysis stages, and return feedback comments to the development interface. These communication paths include mechanisms for retrieving changesets from code repositories, processing those changesets through automated analysis tools, and posting generated comments back to the merge request interface where developers review and respond to the feedback. The bidirectional nature of these communication paths allows for real-time interaction between the automated system and the development workflow.

The processing workflow encompasses multiple sequential stages that transform raw code submissions into comprehensive review feedback. The workflow begins with a describe changes stage 208 that analyzes code modifications to generate summaries of the alterations made. Following the description phase, a review code stage 210 applies various analysis criteria to identify potential issues, compliance gaps, or improvement opportunities within the submitted code. The make suggestions stage 212 builds upon the review analysis to provide specific recommendations for addressing identified issues or enhancing code quality. Finally, an update changelog stage 214 automatically generates documentation updates that reflect the changes made in the code submission, reducing the manual effort required for maintaining project documentation.

The underlying framework utilizes an agent 216 as the foundation for basic code review functionality, providing established patterns and capabilities for analyzing code submissions. This foundation supports the development of specialized tools that extend beyond standard code review capabilities. The system incorporates multiple specialized tools arranged in a branching architecture, including components for finding similar issues, conducting detailed code reviews, generating automatic descriptions, providing question-and-answer capabilities, applying appropriate labels, suggesting code improvements, managing changelog updates, generating code documentation strings, and supporting future extensibility through additional tool integration. Each tool contributes specific capabilities to the overall code review process, enabling comprehensive analysis and feedback generation.

The architectural design facilitates integration with existing development workflows by maintaining compatibility with standard GitLab interfaces and processes. Developers continue to use familiar merge request creation and review interfaces, while the automated system operates transparently in the background to enhance the review process. The system generates various output types including pull request comments, descriptions, labels, inline code suggestions, and documentation updates that appear within the standard development interface. This approach allows organizations to adopt automated code review capabilities without requiring extensive retraining of development teams or significant modifications to established development processes. The modular architecture also supports customization and extension, enabling organizations to adapt the system to their specific coding standards, compliance requirements, and workflow preferences.

Figure 3:
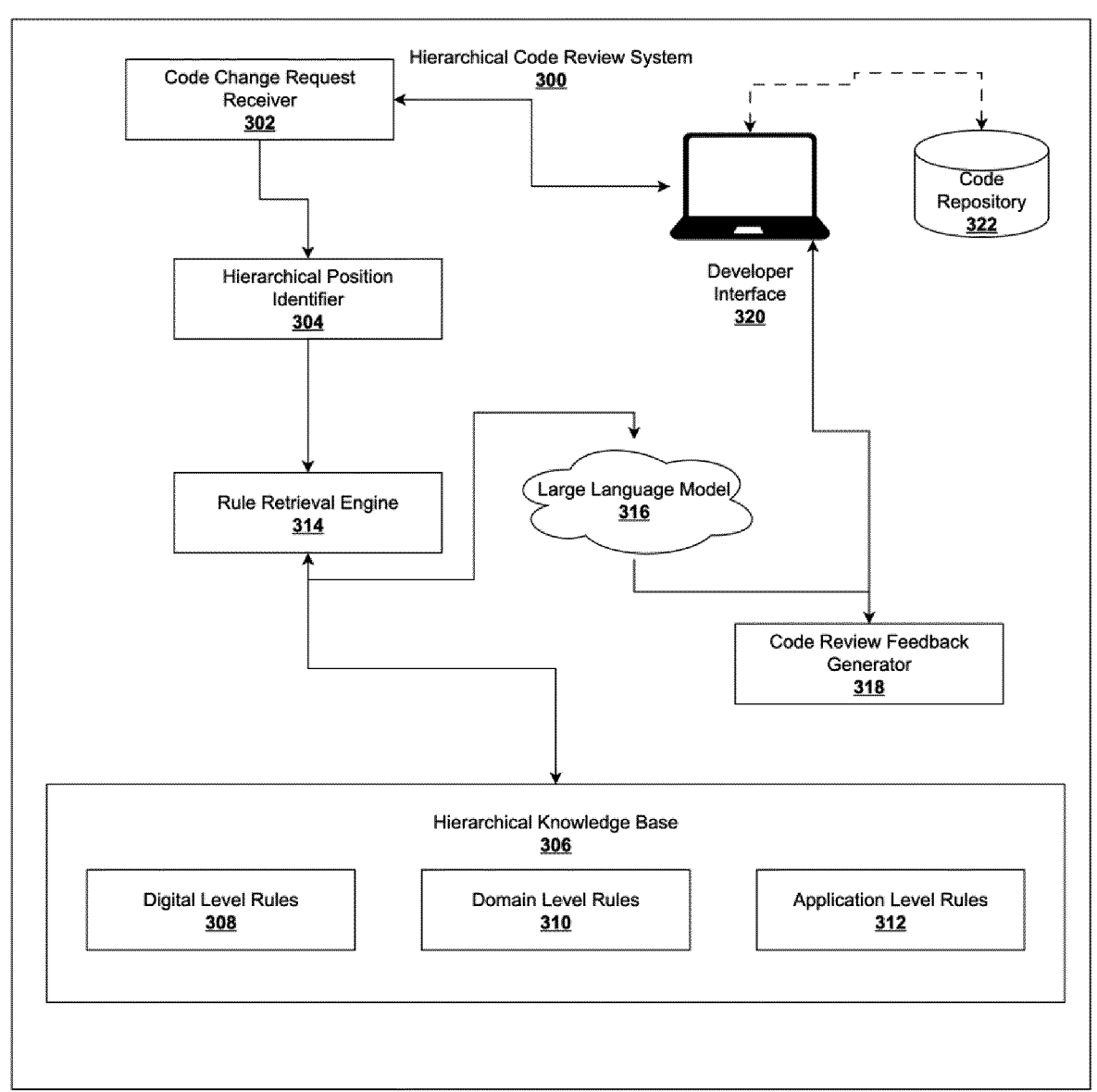
FIG. 3 illustrates a hierarchical code review system with a knowledge base, according to aspects of the present disclosure.

Referring to FIG. 3, a hierarchical code review system 300 provides a comprehensive framework for processing code submissions through multiple organizational levels of review criteria and feedback generation. The hierarchical code review system 300 incorporates specialized components that work together to identify, retrieve, and apply hierarchical code review rules based on organizational structure and positioning. A code change request receiver 302 serves as the entry point for the system, accepting code submissions from developers and initiating the automated review process. The code change request receiver 302 interfaces with development environments to capture code modifications, merge requests, and associated metadata that enables subsequent processing stages to determine appropriate review criteria and organizational context.

A hierarchical position identifier 304 connects to the code change request receiver 302 and analyzes incoming code submissions to determine their position within the organizational hierarchy. The hierarchical position identifier 304 uses card identifiers extracted from GitLab Shield pipeline templates for application identification, enabling the system to map code submissions to specific applications, domains, and organizational levels. In some implementations, the hierarchical position identifier 304 extracts card identifiers from code change requests, where the card identifier corresponds to a specific application within the hierarchical organizational structure. The card identifier serves as a primary key that enables the system to traverse organizational hierarchies and locate applicable code review standards. The identification process involves parsing pipeline configuration files, examining repository metadata, or analyzing code submission paths to establish organizational context.

The system incorporates a hierarchical knowledge base 306 that stores code review rules organized according to the hierarchical organizational structure, where the plurality of code review rules includes rules from multiple organizational levels of the hierarchical organizational structure. The hierarchical knowledge base 306 contains multiple levels of code review standards arranged in a hierarchical structure that reflects organizational divisions and responsibilities. Digital level rules 308 represent enterprise-wide standards that apply across all organizational units, encompassing security policies, compliance requirements, and architectural principles that govern code development practices throughout the organization. Domain level rules 310 contain standards specific to particular business domains or functional areas, such as payment processing, customer management, or fraud detection systems. Application level rules 312 store the most specific code review criteria that apply to individual applications or services within the organizational structure.

With continued reference to FIG. 3, the hierarchical knowledge base 306 includes ISO 202 standards specific to money movement and payment processing domains, providing specialized compliance and regulatory guidance for financial services applications. The hierarchical organizational structure comprises a digital banking ecosystem having multiple organizational levels including a digital level, a domain level, and an application level. The digital level rules 308 encompass enterprise architecture standards, security frameworks, and development methodologies that apply uniformly across all digital banking applications. The domain level rules 310 contain payment processing regulations, anti-money laundering requirements, and domain-specific architectural patterns that govern particular business functions. The application level rules 312 store service-specific coding standards, API design guidelines, and application-specific security configurations that apply to individual software components.

A rule retrieval engine 314 communicates with the hierarchical knowledge base 306 and coordinates the extraction of applicable code review rules based on the hierarchical position identified by the hierarchical position identifier 304. The rule retrieval engine 314 implements a traversal algorithm that starts at the lowest hierarchical level corresponding to the identified hierarchical position and retrieves code review rules specific to that level. The retrieval process continues by traversing upward through parent levels of the hierarchical organizational structure and retrieving additional code review rules from each parent level. The rule retrieval engine 314 accesses application-level rules 312 first, followed by domain level rules 310, and finally digital level rules 308, ensuring that all applicable organizational standards are incorporated into the review process. The rule retrieval engine 314 maintains the hierarchical context of retrieved rules, enabling subsequent processing stages to identify the organizational source of each review criterion.

The system operates across Java, React, and Python codebases with language-specific customizations, allowing the rule retrieval engine 314 to select appropriate coding standards based on the programming languages and frameworks detected in code submissions. Language-specific rules are stored within each hierarchical level, enabling the system to apply Java coding standards for backend services, React development guidelines for frontend applications, and Python best practices for data processing components. The rule retrieval engine 314 combines language-specific rules with organizational hierarchy rules to generate comprehensive review criteria that address both technical and organizational requirements.

As further shown in FIG. 3, a large language model 316 processes the retrieved code review rules and applies them to code change requests to generate detailed analysis and feedback. The large language model 316 receives input from the rule retrieval engine 314 and processes code submissions against the hierarchical set of review criteria. The application of code review rules to code change requests using the large language model 316 generates code review feedback that incorporates standards from multiple organizational levels. The large language model 316 processes code submissions through multiple analysis cycles, where each cycle applies rules from a different organizational level to ensure comprehensive coverage of all applicable standards. The large language model 316 maintains context about the source and hierarchy of applied rules, enabling the generation of feedback that identifies which organizational level contributed each review comment.

A code review feedback generator 318 receives output from the large language model 316 and formats the analysis results into structured feedback that developers can understand and act upon. The code review feedback generator 318 organizes review comments according to their hierarchical source, providing clear identification of whether feedback originates from application-level, domain-level, or digital-level standards. The feedback generation process includes severity classification, remediation suggestions, and references to applicable organizational policies or coding standards. The code review feedback generator 318 produces separate sets of code review comments generated from rules at different organizational levels, where each set of comments is identified according to its corresponding organizational level.

The system includes a developer interface 320 that serves as the communication point between developers and the automated code review system. The developer interface 320 receives code submissions from developers and presents generated feedback in a format that integrates with existing development workflows and tools. The interface displays hierarchical feedback organization, enabling developers to understand the organizational context and rationale behind each review comment. A code repository 322 maintains bidirectional communication with the code change request receiver 302, enabling the system to access code history, branch information, and repository metadata that influence the review process. The code repository 322 also receives updated code submissions after developers address feedback from the automated review system, enabling iterative improvement cycles that continue until all organizational standards are satisfied.

Figure 4:
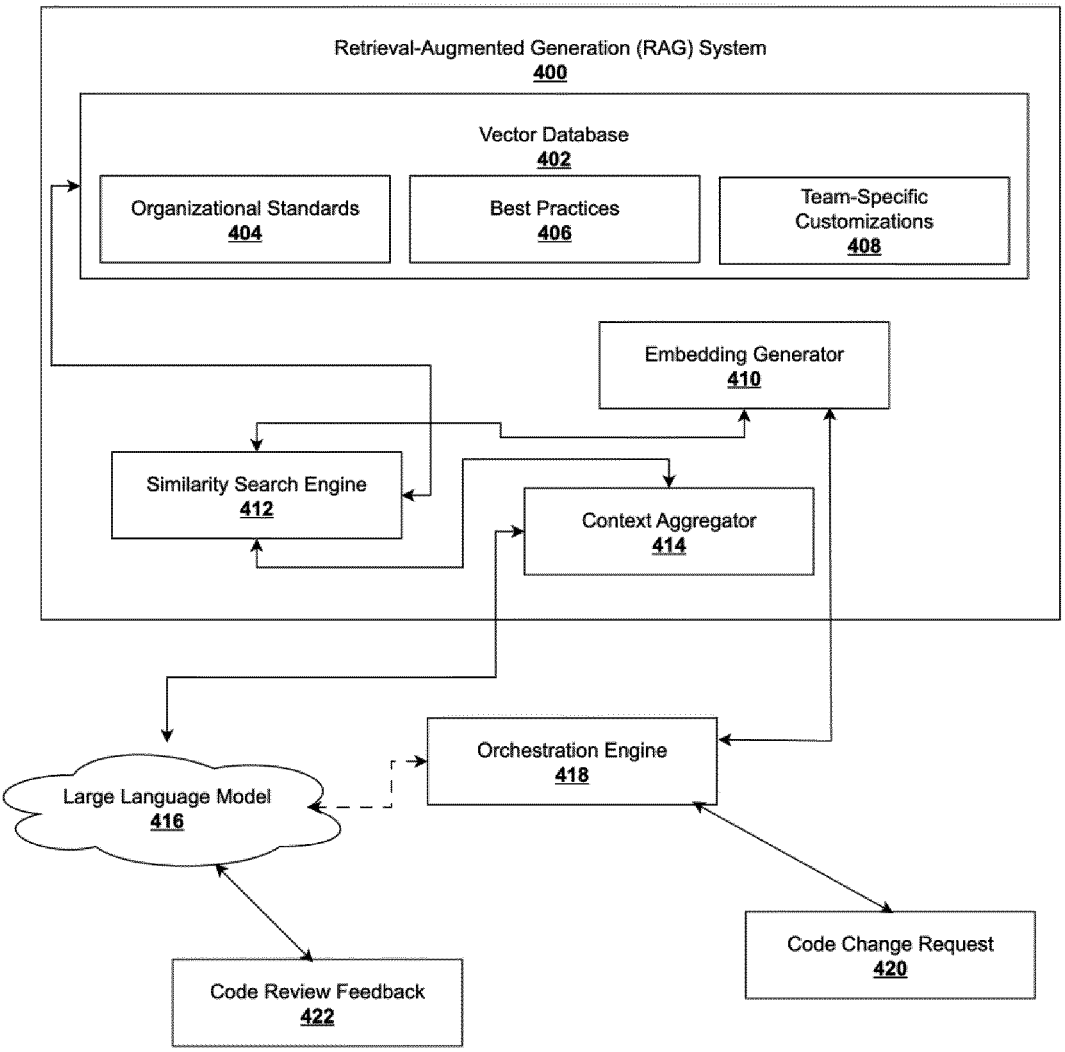
FIG. 4 illustrates a retrieval-augmented generation system for processing code change requests, according to aspects of the present disclosure.

Referring to FIG. 4, a retrieval-augmented generation (RAG) system 400 provides advanced knowledge retrieval and processing capabilities that enhance the hierarchical code review process through sophisticated document analysis and context generation. The retrieval-augmented generation (RAG) system 400 implements the hierarchical knowledge base using retrieval-augmented generation technology that stores organizational standards, best practices, and team-specific customizations in a vector database organized according to the hierarchical organizational structure. The system 400 employs multi-stage retrieval with hybrid retriever architecture for hierarchical processing, enabling comprehensive analysis of code submissions against multiple layers of organizational requirements. An orchestration engine 418 serves as the central coordination component that receives code change request 420 inputs and manages the complex workflow of knowledge retrieval, context generation, and feedback production throughout the automated review process.

The retrieval-augmented generation (RAG) system 400 incorporates a vector database 402 that stores hierarchical knowledge using advanced document processing and organization techniques. The vector database 402 uses semantic chunking and contextual chunking techniques for document processing, enabling the system to maintain meaningful relationships between different pieces of organizational knowledge while preserving hierarchical context. Within the vector database 402, multiple categories of knowledge are maintained in structured formats that support efficient retrieval and application. Organizational standards 404 contain enterprise-wide policies, security requirements, and compliance guidelines that apply across all organizational levels and development activities. Best practices 406 encompass proven methodologies, coding patterns, and development approaches that have been established through organizational experience and industry standards. Team-specific customizations 408 store localized adaptations, specialized requirements, and team-level preferences that reflect the unique needs and contexts of individual development groups within the organizational hierarchy.

The knowledge storage architecture within the vector database 402 maintains hierarchical relationships that enable the system to traverse organizational structures and retrieve applicable standards from multiple levels simultaneously. The vector database 402 organizes knowledge according to the same hierarchical structure used by a hierarchical knowledge base, ensuring consistency between rule storage and retrieval processes. The vector database 402 stores knowledge representations that include metadata about organizational level, applicability scope, and relationship dependencies that enable sophisticated retrieval algorithms to identify relevant standards based on code submission characteristics. The system 400 includes entity linking capabilities across different hierarchical levels for knowledge-aware RAG processing, allowing the vector database 402 to maintain connections between related standards, policies, and practices that span multiple organizational levels.

With continued reference to FIG. 4, an embedding generator 410 processes incoming code submissions and organizational knowledge to create vector representations that enable similarity-based retrieval and matching operations. The embedding generator 410 connects to the orchestration engine 418 and transforms code change request 420 content into high-dimensional vector representations that capture semantic meaning, structural patterns, and contextual relationships within the submitted code. The embedding process analyzes multiple aspects of code submissions including programming language syntax, architectural patterns, functional intent, and organizational context to generate comprehensive vector representations. The embedding generator 410 creates separate embeddings for different aspects of code submissions, enabling the system to perform targeted retrieval operations that focus on specific types of organizational standards or review criteria.

The embedding generation process incorporates task-specific prompt engineering for generating tailored prompts based on retrieved documents, enabling the embedding generator 410 to create context-aware representations that align with specific organizational requirements and review objectives. The embedding generator 410 generates embeddings that reflect hierarchical positioning, programming language characteristics, and domain-specific requirements that influence the relevance and applicability of different organizational standards. The embedding process also incorporates temporal factors, project context, and developer experience levels to create nuanced representations that support sophisticated matching and retrieval operations. The embedding generator 410 maintains consistency in embedding generation across different types of code submissions and organizational contexts, ensuring that similarity calculations and retrieval operations produce reliable and meaningful results.

A similarity search engine 412 performs sophisticated matching operations between code submission embeddings and stored organizational knowledge to identify relevant standards and practices for application during the review process. The similarity search engine 412 interfaces with the vector database 402 to execute high-dimensional similarity calculations that identify organizational standards, best practices, and team-specific customizations that align with submitted code characteristics. The search process employs multiple similarity metrics and ranking algorithms to ensure that retrieved knowledge represents the most applicable and relevant guidance for specific code submissions. The similarity search engine 412 performs hierarchical search operations that prioritize knowledge retrieval based on organizational level proximity, ensuring that application-specific standards receive appropriate weighting relative to domain-level and enterprise-level requirements.

The similarity search engine 412 implements hybrid retriever architecture that combines multiple search strategies to optimize knowledge retrieval across different types of organizational standards and code submission characteristics. The hybrid approach incorporates dense vector similarity calculations for semantic matching, sparse keyword-based retrieval for specific technical requirements, and graph-based traversal for hierarchical relationship exploration. The similarity search engine 412 adjusts search parameters and weighting factors based on code submission metadata, organizational context, and historical review patterns to optimize retrieval relevance and coverage. The search engine maintains performance optimization through indexing strategies, caching mechanisms, and parallel processing capabilities that enable real-time knowledge retrieval even for large organizational knowledge bases and complex hierarchical structures.

As further shown in FIG. 4, a context aggregator 414 receives retrieved knowledge from the similarity search engine 412 and synthesizes multiple sources of organizational standards into coherent context packages that support comprehensive code review analysis. The context aggregator 414 processes retrieved organizational standards, best practices, and team-specific customizations to create structured context representations that maintain hierarchical relationships and applicability scope. The aggregation process involves deduplication of overlapping standards, resolution of conflicting requirements, and prioritization of guidance based on organizational hierarchy and specificity levels. The context aggregator 414 generates multiple context packages that correspond to different organizational levels, enabling subsequent processing stages to apply hierarchical standards in appropriate sequence and combination.

The context aggregator 414 maintains awareness of hierarchical relationships between retrieved knowledge elements, ensuring that context packages preserve the organizational structure and inheritance patterns that govern standard application. The aggregation process incorporates dependency analysis that identifies prerequisite standards, complementary requirements, and potential conflicts between different organizational levels or functional domains. The context aggregator 414 also performs relevance scoring and confidence assessment for retrieved knowledge, enabling downstream processing components to weight different standards appropriately based on their applicability and reliability for specific code submission contexts. The context aggregation process supports the generation of comprehensive review criteria that incorporate multiple organizational perspectives while maintaining clarity about the source and authority of different requirements.

A large language model 416 receives aggregated context from the context aggregator 414 and applies retrieved organizational knowledge to generate detailed code review analysis and recommendations. The large language model 416 processes code submissions against the hierarchical context packages to produce comprehensive feedback that incorporates standards from multiple organizational levels and functional domains. The language model processing involves multiple analysis cycles where each cycle focuses on different aspects of the aggregated context, enabling thorough coverage of all applicable organizational requirements. The large language model 416 generates separate analysis results for different organizational levels, maintaining traceability between review comments and their underlying organizational standards.

The orchestration engine 418 coordinates multiple interactions with the large language model 416, where each interaction applies code review rules from a different organizational level of the hierarchical organizational structure. The orchestration engine 418 manages the complex workflow of knowledge retrieval, context generation, and feedback production by coordinating the activities of all system components and ensuring proper sequencing of processing operations. The orchestration process involves iterative cycles where initial analysis results inform subsequent knowledge retrieval operations, enabling the system to refine and enhance review feedback based on emerging insights and identified requirements. The orchestration engine 418 coordinates multiple LLM interactions using frameworks like Langraph with memory capabilities, enabling sophisticated workflow management that maintains state information and context continuity across multiple processing stages.

The orchestration engine 418 manages the integration between the retrieval-augmented generation (RAG) system 400 and other system components, ensuring that retrieved knowledge and generated context align with hierarchical positioning determined by the hierarchical position identifier 304 and rules retrieved by the rule retrieval engine 314. The orchestration process involves coordination with the code review feedback generator 318 to ensure that generated feedback maintains proper attribution to organizational levels and knowledge sources. The orchestration engine 418 produces code review feedback 422 that incorporates the comprehensive analysis results and maintains traceability to the hierarchical knowledge sources that contributed to each review comment and recommendation. The orchestrated workflow enables the system to generate detailed, contextually appropriate, and organizationally aligned code review feedback that addresses multiple layers of requirements while maintaining clarity about the source and rationale for each recommendation.

The hierarchical rule retrieval process implements a systematic approach for accessing and applying code review standards from multiple organizational levels within the enterprise structure. The retrieval process begins by identifying the lowest hierarchical level that corresponds to the specific code submission, typically at the application or service level where the most granular and specialized coding standards apply. The system examines the card identifier associated with the code change request to determine the precise organizational position and establishes the starting point for rule retrieval operations. The card identifier serves as a reference key that maps to specific applications, services, or components within the organizational hierarchy, enabling the system to locate the most relevant and specific coding standards that apply to the submitted code changes.

The rule retrieval algorithm starts at the lowest hierarchical level corresponding to the identified hierarchical position and retrieves code review rules specific to that level. Application-level rules encompass service-specific coding patterns, API design guidelines, database interaction standards, and component-specific security configurations that apply exclusively to the particular application or service being modified. The retrieval process accesses these application-specific standards first to ensure that the most targeted and relevant coding requirements are captured and applied during the review analysis. The system maintains detailed records of which rules are retrieved from each hierarchical level, enabling subsequent processing stages to maintain traceability and attribution for each applied standard.

Following the retrieval of application-level rules, the system initiates an upward traversal process that systematically accesses parent levels within the organizational hierarchy. The traversal algorithm identifies the immediate parent domain or functional area that contains the application and retrieves additional code review rules from that domain level. Domain-level rules include business function-specific standards, regulatory compliance requirements, data handling protocols, and architectural patterns that apply across multiple applications within the same functional domain. The system continues this upward traversal process through successive parent levels, accessing department-level standards, division-level policies, and enterprise-wide requirements that apply to the code submission based on its organizational positioning.

The upward traversal through parent levels of the hierarchical organizational structure ensures comprehensive coverage of all applicable organizational standards while maintaining awareness of rule precedence and inheritance relationships. Each parent level contributes additional code review rules that address broader organizational concerns such as security frameworks, compliance mandates, architectural principles, and development methodologies that span multiple domains and applications. The retrieval process encounters overlapping or conflicting standards between different hierarchical levels, requiring the system to implement resolution mechanisms that prioritize more specific rules over general ones while maintaining compliance with all applicable organizational requirements. The system documents the hierarchical source of each retrieved rule set, enabling downstream processing components to understand the organizational context and authority behind each applied standard.

The sequential application of code review rules from different organizational levels generates separate sets of code review comments that maintain clear attribution to their hierarchical sources. The system processes the submitted code against application-level rules first, generating a set of review comments that address service-specific coding standards, architectural compliance, and component-level best practices. Following the application-level analysis, the system applies domain-level rules to the same code submission, generating additional review comments that address business function requirements, regulatory compliance, and domain-specific security considerations. The process continues through each hierarchical level, with enterprise-level rules generating comments related to organization-wide policies, security frameworks, and strategic architectural decisions.

The code review feedback includes an identification of which organizational level generated each code review comment, providing developers with clear context about the source and authority behind each recommendation. The feedback organization system maintains separate comment categories that correspond to different hierarchical levels, enabling developers to understand whether specific feedback originates from application-specific standards, domain-level requirements, or enterprise-wide policies. This hierarchical attribution enables developers to prioritize their response to feedback based on organizational importance and scope, while also providing educational value about the various layers of standards that apply to their code development activities. The system assigns different priority levels or severity classifications to comments based on their hierarchical source, with enterprise-level compliance issues receiving higher priority than application-specific style recommendations.

The rule retrieval process incorporates cost accounting mechanisms that track resource utilization based on card identifier usage, enabling organizations to monitor and allocate the computational expenses associated with automated code review operations. The system maintains detailed records of language model token consumption, processing time, and storage access patterns associated with each card identifier, providing visibility into the resource costs generated by different applications, domains, and organizational units. Token cost accounting and charging capabilities based on card identifier usage enable organizations to implement chargeback models that allocate automated code review expenses to the appropriate cost centers and development teams. The cost tracking system differentiates between different types of processing operations, such as rule retrieval, language model analysis, and feedback generation, providing granular visibility into resource utilization patterns across the organizational hierarchy.

The hierarchical rule retrieval process maintains state information throughout the traversal operations, enabling the system to optimize subsequent retrieval requests and cache frequently accessed rule sets for improved performance. The system implements intelligent caching strategies that store commonly used rule combinations based on organizational patterns and code submission characteristics, reducing the computational overhead associated with repeated hierarchical traversals. The retrieval process also incorporates learning mechanisms that adapt rule selection and prioritization based on historical feedback patterns and developer response behaviors, enabling continuous improvement in the relevance and effectiveness of applied organizational standards. The state management capabilities ensure that complex hierarchical traversals maintain consistency and completeness while supporting concurrent processing of multiple code review requests across different organizational contexts.

Figure 5:
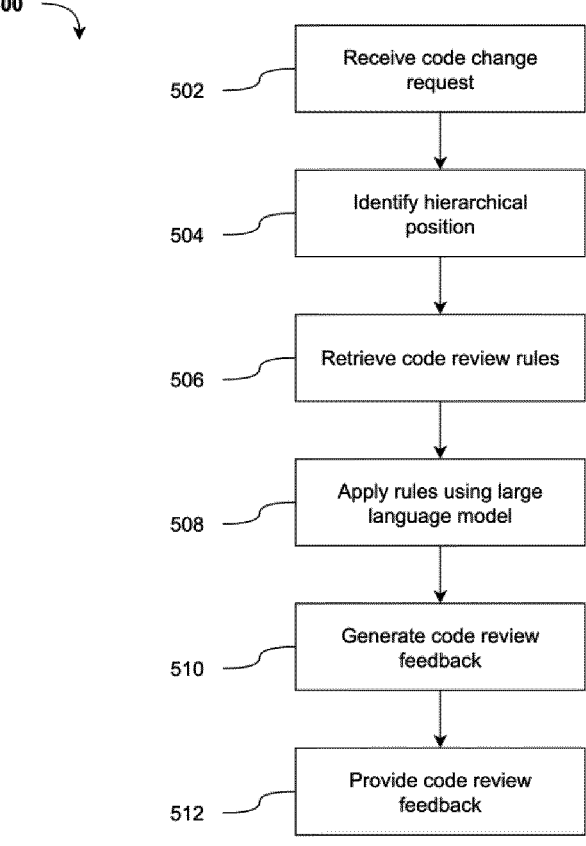
FIG. 5 illustrates a flowchart for a computer-implemented method for automated code review, according to aspects of the present disclosure.

Referring to FIG. 5, a method 500 provides a computer-implemented approach for automated code review that incorporates hierarchical organizational structures and retrieval-augmented generation technology to enhance code analysis and feedback generation. The method 500 begins with a step 502 that involves receiving a code change request associated with a hierarchical organizational structure having multiple organizational levels. The code change request originates from developers working within various organizational contexts, including digital banking ecosystems, enterprise software environments, or other structured organizational frameworks where multiple levels of coding standards and compliance requirements apply to software development activities. The step 502 involves interfacing with development environments, version control systems, or continuous integration pipelines to capture code modifications, merge requests, and associated metadata that enables subsequent processing stages to determine appropriate review criteria and organizational context.

The method 500 continues with a step 504 that focuses on identifying a hierarchical position within the organizational structure corresponding to the code change request. The step 504 involves extracting a card identifier from the code change request, where the card identifier corresponds to a specific application within the hierarchical organizational structure. The card identifier serves as a reference key that enables the system to map code submissions to particular applications, domains, and organizational levels within the enterprise structure. The step 504 involves parsing pipeline configuration files, examining repository metadata, or analyzing code submission paths to establish organizational context and determine the precise positioning within the hierarchical framework. The hierarchical organizational structure comprises a digital banking ecosystem having multiple organizational levels including a digital level, a domain level, and an application level, where each level contributes distinct coding standards and compliance requirements that apply to code development activities.

With continued reference to FIG. 5, the method 500 proceeds to a step 506 that encompasses retrieving a plurality of code review rules from a hierarchical knowledge base, where the hierarchical knowledge base stores code review rules organized according to the hierarchical organizational structure. The plurality of code review rules includes rules from multiple organizational levels of the hierarchical organizational structure, ensuring comprehensive coverage of all applicable standards and requirements. The step 506 involves starting at a lowest hierarchical level corresponding to the identified hierarchical position and retrieving code review rules specific to that level, followed by traversing upward through parent levels of the hierarchical organizational structure and retrieving additional code review rules from each parent level. The retrieval process accesses application-specific standards first, followed by domain-level requirements, and finally enterprise-wide policies that apply to the code submission based on organizational positioning and scope.

The method 500 advances to a step 508 that involves applying the plurality of code review rules to the code change request using a large language model to generate code review feedback. The step 508 coordinates multiple interactions with the large language model, where each interaction applies code review rules from a different organizational level of the hierarchical organizational structure. The application process involves processing the code submission through multiple analysis cycles, where each cycle focuses on different aspects of the retrieved rules to ensure thorough coverage of all applicable organizational requirements. The step 508 generates separate sets of code review comments from rules at different organizational levels, maintaining clear attribution to the hierarchical source of each review criterion and recommendation. The large language model processing incorporates contextual analysis, pattern recognition, and compliance assessment capabilities that enable comprehensive evaluation of code submissions against complex organizational standards.

As further shown in FIG. 5, the method 500 concludes with a step 510 that encompasses providing the code review feedback for the code change request. The step 510 involves organizing review comments according to their hierarchical source, providing clear identification of whether feedback originates from application-level, domain-level, or enterprise-level standards. The code review feedback includes an identification of which organizational level generated each code review comment, enabling developers to understand the organizational context and authority behind each recommendation. The step 510 also involves formatting the feedback for integration with existing development workflows, presenting the results through developer interfaces, and maintaining traceability between review comments and their underlying organizational standards. The code review feedback generator provides contextual PR analysis and summarization capabilities that enhance the presentation and comprehension of generated feedback, enabling developers to efficiently understand the purpose and impact of recommended code modifications.

Figure 6:
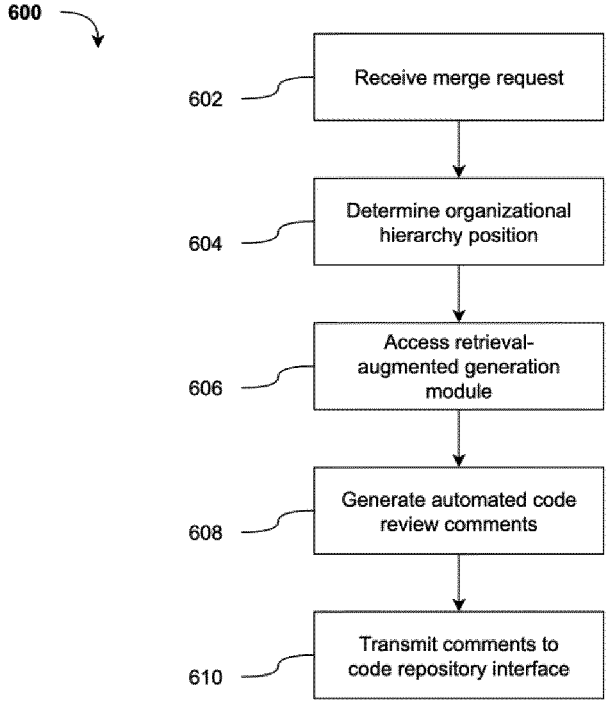
FIG. 6 illustrates a flowchart for a hierarchical code review automation system, according to aspects of the present disclosure.

Referring to FIG. 6, a method 600 demonstrates a system-based approach for hierarchical code review automation that leverages processor-based computing resources and memory-stored instructions to implement comprehensive automated review capabilities. The method 600 incorporates a processor and a memory storing instructions that, when executed by the processor, cause the system to perform various automated code review operations. The method 600 begins with a step 602 that involves receiving a merge request from a developer, where the merge request represents a code submission that requires analysis and feedback according to organizational standards and best practices. The step 602 involves interfacing with code repository systems, development environments, or continuous integration platforms to capture merge request content, metadata, and contextual information that supports subsequent analysis and processing operations.

The method 600 continues with a step 604 that focuses on determining an organizational hierarchy position associated with the merge request. The step 604 involves extracting a card identifier from the merge request to determine the organizational hierarchy position, where the card identifier corresponds to a specific application within the organizational hierarchy. The organizational hierarchy comprises a digital banking ecosystem having multiple organizational levels including a digital level, a domain level, and an application level, where each level contributes distinct standards and requirements that apply to code development activities. The step 604 involves analyzing merge request metadata, repository information, or pipeline configuration data to establish the precise organizational context and positioning within the hierarchical structure. The determination process also considers project associations, team memberships, and functional domain classifications that influence the applicable standards and review criteria.

With continued reference to FIG. 6, the method 600 proceeds to a step 606 that encompasses accessing a retrieval-augmented generation module configured with a hierarchical knowledge base containing code review standards organized by organizational levels. The retrieval-augmented generation module is configured to retrieve code review standards by starting at a lowest hierarchical level corresponding to the organizational hierarchy position and traversing upward through parent levels to retrieve additional code review standards from each parent level. The hierarchical knowledge base stores organizational standards, best practices, and team-specific customizations in a vector database organized according to the organizational hierarchy, enabling sophisticated retrieval and application of relevant standards based on organizational context and positioning. The step 606 involves coordinating with a system such as the Retrieval-Augmented Generation (RAG) System 400 described with reference to FIG. 4 to access stored knowledge and generate appropriate context for subsequent analysis operations.

The method 600 advances to a step 608 that involves generating automated code review comments by processing the merge request through the retrieval-augmented generation module and a large language model, where the automated code review comments incorporate code review standards from multiple levels of the organizational hierarchy. The step 608 involves using an orchestration engine to coordinate multiple interactions with the large language model, where each interaction applies code review standards from a different organizational level of the organizational hierarchy. The automated code review comments include separate sets of comments generated from code review standards at different organizational levels, where each set of comments is identified according to its corresponding organizational level. The generation process incorporates contextual analysis, compliance assessment, and pattern recognition capabilities that enable comprehensive evaluation of merge requests against complex organizational requirements and standards.

As further shown in FIG. 6, the method 600 concludes with a step 610 that encompasses transmitting the automated code review comments to a code repository interface. The step 610 involves formatting the generated comments for integration with existing development workflows and presenting the results through interfaces that developers use for code review and collaboration activities. The transmission process maintains the hierarchical organization of comments, enabling developers to understand the organizational source and context of each recommendation. The step 610 also involves coordinating with a developer interface to ensure that feedback presentation aligns with established development practices and provides clear guidance for addressing identified issues and recommendations. The system automatically generates comprehensive changelogs and architectural decision records without developer intervention, reducing the manual effort associated with maintaining project documentation and ensuring consistent record-keeping across development activities.

Figure 7:
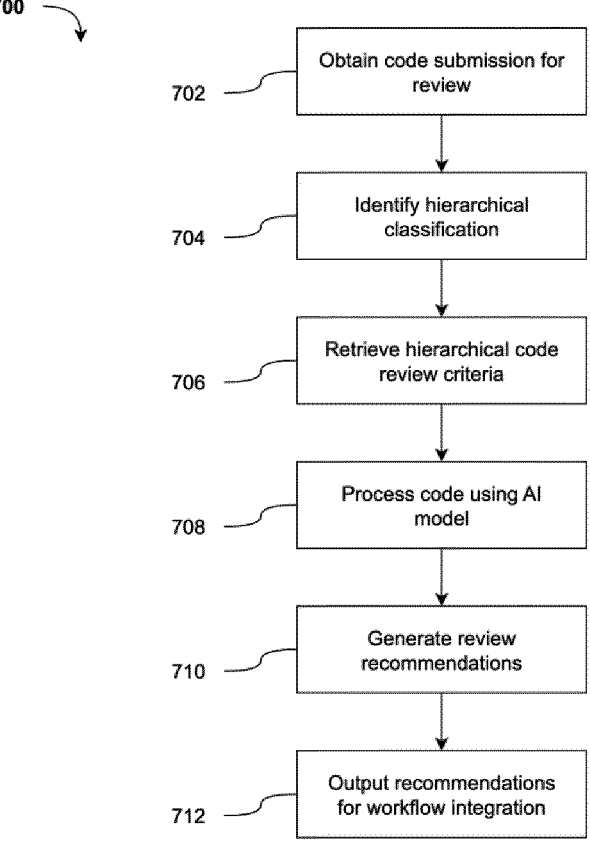
FIG. 7 illustrates a flowchart for a code review process using hierarchical classification, according to aspects of the present disclosure.

Referring to FIG. 7, a method 700 illustrates a non-transitory computer-readable storage medium approach that stores instructions for executing automated code review operations through processor-based computing systems. The method 700 provides a non-transitory computer-readable storage medium storing instructions that, when executed by a processor, cause the processor to perform operations comprising various automated code review functions. The method 700 begins with a step 702 that involves obtaining a code submission for review, where the code submission represents developer-generated code modifications that require analysis according to organizational standards and compliance requirements. The step 702 involves interfacing with version control systems, development environments, or continuous integration platforms to capture code submission content, associated metadata, and contextual information that supports subsequent analysis and processing operations.

The method 700 continues with a step 704 that focuses on identifying a hierarchical classification for the code submission within an organizational structure. The step 704 involves extracting a card identifier from the code submission, where the card identifier corresponds to a specific application within the organizational structure. The organizational structure comprises a digital banking ecosystem having multiple organizational levels including a digital level, a domain level, and an application level, where each level contributes distinct standards and requirements that govern code development practices. The step 704 involves analyzing code submission characteristics, repository associations, or project metadata to establish the precise organizational classification and positioning within the hierarchical framework. The identification process also considers functional domain associations, team memberships, and compliance scope factors that influence the applicable standards and review criteria.

With continued reference to FIG. 7, the method 700 proceeds to a step 706 that encompasses retrieving hierarchical code review criteria from a structured knowledge repository, where the hierarchical code review criteria includes standards from different organizational levels. The step 706 involves starting at a lowest organizational level corresponding to the hierarchical classification and traversing upward through parent levels to retrieve additional standards from each parent level. The structured knowledge repository comprises a vector database organized according to the organizational structure and storing organizational standards, best practices, and team-specific customizations that enable comprehensive coverage of applicable requirements. The retrieval process coordinates with the Vector Database 402 to access stored knowledge representations and generate appropriate context for subsequent analysis operations, ensuring that all relevant organizational standards are incorporated into the review process.

The method 700 advances to a step 708 that involves processing the code submission using an artificial intelligence model trained on code review patterns to generate review recommendations based on the hierarchical code review criteria. The step 708 involves coordinating multiple interactions with the artificial intelligence model, where each interaction applies standards from different organizational levels to ensure comprehensive coverage of all applicable requirements. The processing operations incorporate contextual analysis, pattern recognition, and compliance assessment capabilities that enable thorough evaluation of code submissions against complex organizational standards and best practices. The step 708 generates separate analysis results for different organizational levels, maintaining traceability between review recommendations and their underlying organizational standards and requirements.

As further shown in FIG. 7, the method 700 continues with a step 710 that encompasses generating review recommendations based on the artificial intelligence model processing results. The step 710 involves organizing recommendations according to their hierarchical source and providing clear identification of the organizational level that contributed each recommendation. The review recommendations include separate sets of recommendations generated from standards at different organizational levels, where each set of recommendations is identified according to its corresponding organizational level. The generation process incorporates severity classification, remediation guidance, and references to applicable organizational policies or coding standards that provide developers with comprehensive guidance for addressing identified issues and implementing recommended improvements.

The method 700 concludes with a step 712 that involves outputting the review recommendations for integration into a development workflow. The step 712 involves formatting the generated recommendations for compatibility with existing development tools, interfaces, and collaboration platforms that developers use for code review and project management activities. The output process maintains the hierarchical organization of recommendations, enabling developers to understand the organizational context and authority behind each suggestion. The step 712 also involves coordinating with development workflow systems to ensure that recommendations are presented in formats that support efficient developer response and implementation activities, while maintaining traceability to the organizational standards and requirements that generated each recommendation.

Figure 8:
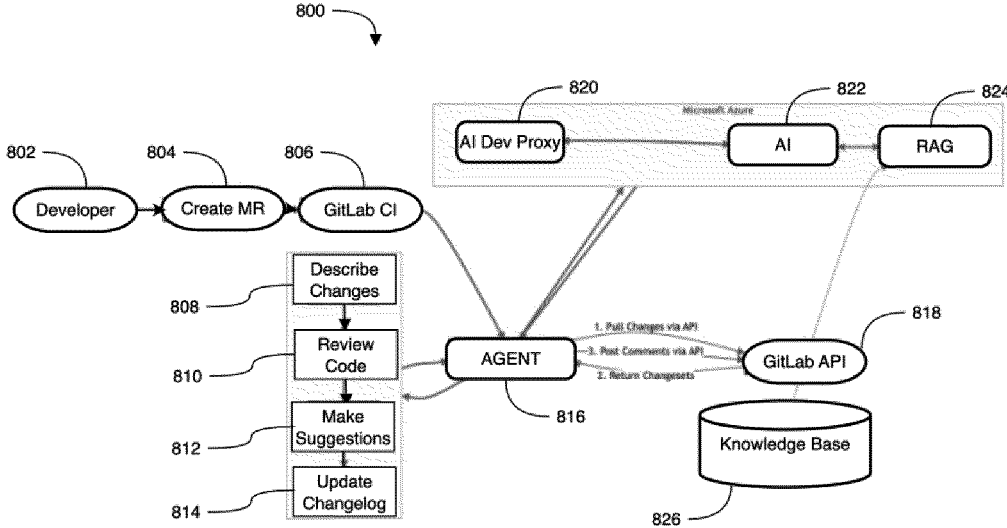
FIG. 8 illustrates a block diagram of a retrieval-augmented generation module architecture, according to aspects of the present disclosure.

FIG. 8 illustrates a RAG module architecture system 800 showing a comprehensive integration framework that connects developer workflows with cloud-based artificial intelligence services and automated code review capabilities through a sophisticated orchestration of components and data flows. The architecture system 800 begins with a developer component 802 that initiates code modification activities and interfaces with development environments to create merge requests that require automated review and analysis. The developer component 802 connects directly to a Create MR component 804 that manages the merge request creation process and captures code changes, metadata, and contextual information that supports subsequent automated processing stages. The Create MR component 804 establishes the foundation for automated code review workflows by interfacing with version control systems and development platforms to extract code modifications and associated project information.

A GitLab CI component 806 serves as the continuous integration platform that receives merge requests from the Create MR component 804 and coordinates the execution of automated review processes within established development pipelines. A GitLab CI component 806 integrates seamlessly with existing development workflows, enabling automated code review operations to occur transparently within standard continuous integration processes without requiring modifications to established developer practices or tool configurations. The integration approach allows development teams to maintain familiar workflows while benefiting from enhanced automated analysis capabilities that supplement traditional manual review processes. The GitLab CI component 806 manages the coordination between development activities and automated review services, ensuring that code submissions receive appropriate analysis according to organizational standards and compliance requirements.

The architecture incorporates a functions section that contains multiple specialized processing components arranged in a sequential workflow structure. The functions section includes a describe changes component 808 that analyzes code modifications to generate comprehensive summaries of alterations made during development activities. Following the description phase, a review code component 810 applies various analysis criteria to identify potential issues, compliance gaps, security vulnerabilities, and improvement opportunities within submitted code changes. The make suggestions component 812 builds upon the review analysis to provide specific recommendations for addressing identified issues and enhancing code quality according to organizational standards and best practices. The update changelog component 814 automatically generates documentation updates that reflect changes made in code submissions, reducing manual effort associated with maintaining project documentation and ensuring consistent record-keeping across development activities.

An agent 816 serves as the central coordination component that manages interactions between the automated review functions and external systems, including a GitLab API component 818 that facilitates communication with the continuous integration platform. The agent 816 orchestrates the complex workflow of code analysis, feedback generation, and result delivery by coordinating the activities of specialized processing components and ensuring proper sequencing of operations. The agent 816 implements a hierarchical multi-agent collaboration approach, assigning different agents to specialized tasks including high-level context retrieval, detailed evidence gathering, and final output generation. This hierarchical structure enables sophisticated workflow management that preserves context continuity across multiple analysis stages and supports iterative refinement of review results based on emerging insights and identified requirements. The agent 816 interfaces with the GitLab API component 818 to retrieve code changes, submit analysis results, and coordinate feedback delivery through established development interfaces and collaboration platforms.

The system 800 integrates with a cloud infrastructure such as Microsoft Azure to provide computational resources and artificial intelligence capabilities that support automated code review operations. The architecture includes an AI Dev Proxy component 820 that serves as an intermediary between the automated review system and Azure-based artificial intelligence services, managing authentication, request routing, and response processing for cloud-based analysis operations. The AI Dev Proxy component 820 connects to an AI service 822 that provides advanced language processing capabilities for analyzing code submissions against organizational standards and generating detailed feedback and recommendations. The AI service 822 integration enables the system 800 to leverage sophisticated natural language processing and code analysis capabilities while maintaining the security and compliance requirements associated with enterprise development environments.

An AI search component in a RAG 824 provides advanced search and retrieval capabilities that enable the system to access and process organizational knowledge bases, coding standards, and best practices stored within cloud-based repositories. The AI search component implements a customized Retrieval-Augmented Generation approach specifically designed for hierarchical organizational best practices. This component utilizes hybrid retriever architectures that combine multiple retrievers to enhance information retrieval effectiveness. The system employs a dense and sparse combination approach, pairing dense models (e.g., Dense Passage Retriever-DPR) with sparse models (e.g., BM25) to capture both semantic and keyword relevance within organizational knowledge bases. Additionally, the AI search component implements multi-stage retrieval processes, where an initial stage performs broad retrieval operations followed by subsequent stages that refine results using dense retrievers or cross-encoders. This sophisticated retrieval approach interfaces with the AI service 822 to coordinate knowledge retrieval operations with language model processing, ensuring that automated code review analysis incorporates relevant organizational context and applicable standards at different hierarchical levels. The integration between AI search and AI service 822 enables comprehensive analysis that combines retrieved organizational knowledge with advanced language processing to generate contextually appropriate and organizationally aligned code review feedback. The system 800 incorporates a knowledge base component 826 that stores organizational standards, best practices, and team customizations in structured formats that support efficient retrieval and application during automated review processes. The knowledge base component 826 contains standards that represent enterprise-wide policies, security requirements, and compliance guidelines that apply across organizational levels and development activities. Best practices encompass proven methodologies, coding patterns, and development approaches that have been established through organizational experience and industry standards. Team customizations store localized adaptations, specialized requirements, and team-level preferences that reflect the unique needs and contexts of individual development groups within the organizational hierarchy. The knowledge base component 826 maintains hierarchical relationships between different types of organizational knowledge, enabling the system to retrieve and apply appropriate standards based on code submission context and organizational positioning. This hierarchical structure supports the multi-stage retrieval process, allowing the system to navigate from broad organizational standards to specific team-level customizations as needed for comprehensive code review analysis.

Computing Environment

Figure 9:
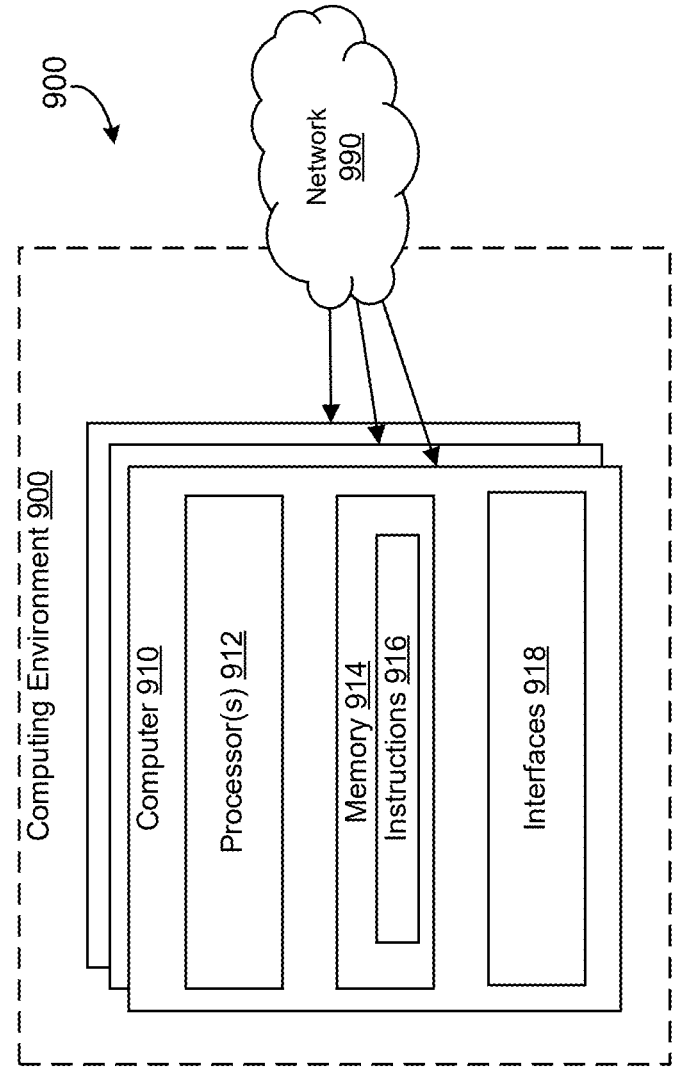
FIG. 9 illustrates a computing environment in which aspects of the present disclosure may be implemented, in accordance with an implementation.

FIG. 9 discloses a computing environment 900 in which aspects of the present disclosure may be implemented. A computing environment 900 is a set of one or more virtual or physical computers 910 that individually or in cooperation achieve tasks, such as implementing one or more aspects described herein. The computers 910 have components that cooperate to cause output based on input. Example computers 910 include desktops, servers, mobile devices (e.g., smart phones and laptops), payment terminals, wearables, virtual/augmented/expanded reality devices, spatial computing devices, virtualized devices, other computers, or combinations thereof. In particular example implementations, the computing environment 900 includes at least one physical computer.

The computing environment 900 may specifically be used to implement one or more aspects described herein. In some examples, one or more of the computers 910 may be implemented as a user device, such as a mobile device, and others of the computers 910 may be used to implement aspects of a machine learning framework useable to train and deploy models exposed to the mobile device or provide other functionality, such as through exposed application programming interfaces.

The computing environment 900 can be arranged in any of a variety of ways. The computers 910 can be local to or remote from other computers 910 of the environment 900. The computing environment 900 can include computers 910 arranged according to client-server models, peer-to-peer models, edge computing models, other models, or combinations thereof.

In many examples, the computers 910 are communicatively coupled with devices internal or external to the computing environment 900 via a network 990. The network 990 is a set of devices that facilitate communication from a sender to a destination, such as by implementing communication protocols. Example networks 990 include local area networks, wide area networks, intranets, or the Internet.

In some implementations, computers 910 can be general-purpose computing devices (e.g., consumer computing devices). In some instances, via hardware or software configuration, computers 910 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 910 include one or more processors 912, memory 914, and one or more interfaces 918. Such components can be virtual, physical, or combinations thereof.

The one or more processors 912 are components that execute instructions, such as instructions that obtain data, process the data, and provide output based on the processing. The one or more processors 912 often obtain instructions and data stored in the memory 914. The one or more processors 912 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 912 include at least one physical processor implemented as an electrical circuit. Example providers processors 912 include INTEL, AMD, QUALCOMM, TEXAS INSTRUMENTS, and APPLE.

The memory 914 is a collection of components configured to store instructions 916 and data for later retrieval and use. The instructions 916 can, when executed by the one or more processors 912, cause execution of one or more operations that implement aspects described herein. In many examples, the memory 914 is a non-transitory computer-readable medium, such as random access memory, read only memory, cache memory, registers, portable memory (e.g., enclosed drives or optical disks), mass storage devices, hard drives, solid state drives, other kinds of memory, or combinations thereof. In certain circumstances, transitory memory 914 can store information encoded in transient signals.

The one or more interfaces 918 are components that facilitate receiving input from and providing output to something external to the computer 910, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors, such as those using the Global Positioning System), other input components, or combinations thereof (e.g., a touch sensitive display). The one or more interfaces 918 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as WI-FI, cellular, BLUETOOTH, ZIGBEE, or other protocols). One or more of the one or more interfaces 918 can facilitate connection of the computing environment 900 to a network 990.

The computers 910 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Machine Learning Framework

Figure 10:
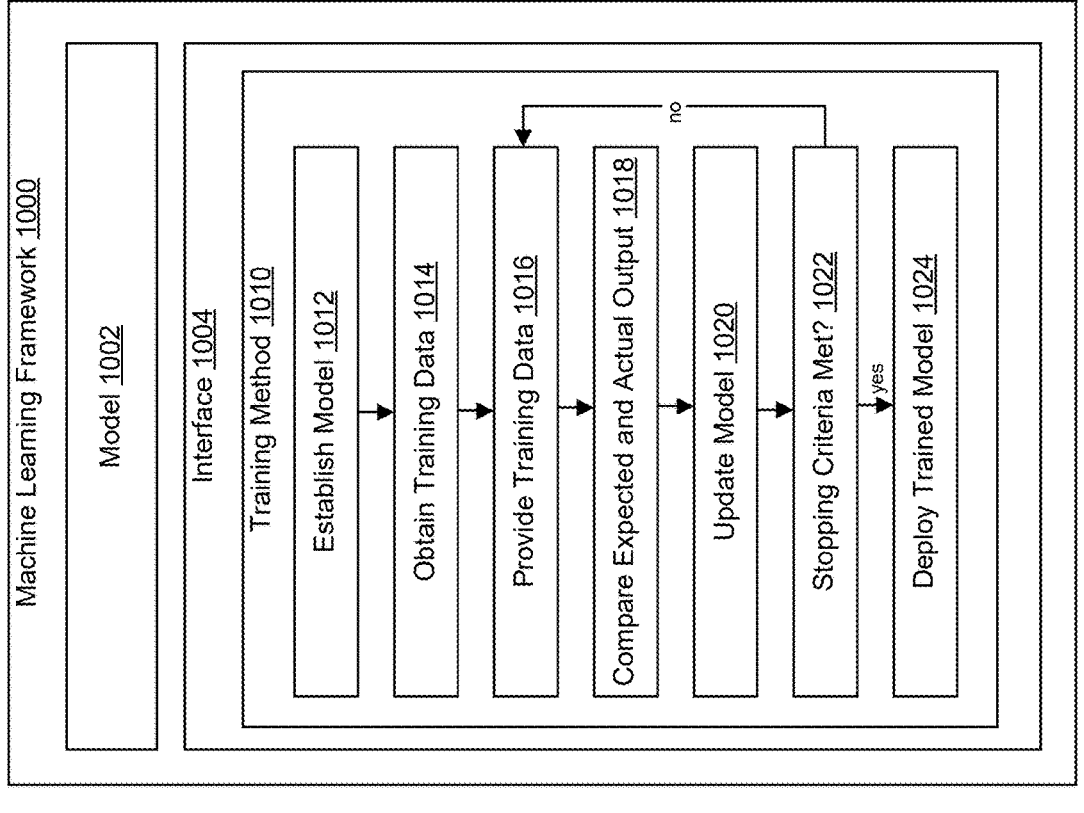

FIG. 10 illustrates an example machine learning framework 1000 that techniques described herein may benefit from. A machine learning framework 1000 is a collection of software and data that implements artificial intelligence trained to provide output, such as predictive data, based on input. Examples of artificial intelligence that can be implemented with machine learning ways include neural networks (including recurrent neural networks), language models (including so-called "large language models"), generative models, natural language processing models, adversarial networks, decision trees, Markov models, support vector machines, genetic algorithms, others, or combinations thereof. A person of skill in the art, having the benefit of this disclosure, will understand that these artificial intelligence implementations need not be equivalent to each other and may instead select from among them based on the context in which they will be used. Machine learning frameworks 1000 or components thereof are often built or refined from existing frameworks, such as TENSORFLOW by GOOGLE, INC. or PYTORCH by the PYTORCH community.

The machine learning framework 1000 can include one or more models 1002 that are the structured representation of learning and an interface 1004 that supports use of the model 1002.

The model 1002 can take any of a variety of forms. In many examples, the model 1002 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 1002 can include a representation of memory (e.g., providing long short-term memory functionality). Where the set includes more than one model 1002, the models 1002 can be linked, cooperate, or compete to provide output.

The interface 1004 can include software procedures (e.g., defined in a library) that facilitate the use of the model 1002, such as by providing a way to establish and interact with the model 1002. For instance, the software procedures can include software for receiving input, preparing input for use (e.g., by performing vector embedding, such as using Word2Vec, BERT, or another technique), processing the input with the model 1002, providing output, training the model 1002, performing inference with the model 1002, fine tuning the model 1002, other procedures, or combinations thereof.

In an example implementation, interface 1004 can be used to facilitate a training method 1010 that can include operation 1012. Operation 1012 includes establishing a model 1002, such as initializing a model 1002. The establishing can include setting up the model 1002 for further use (e.g., by training or fine tuning). The model 1002 can be initialized with values. In examples, the model 1002 can be pre-trained. Operation 1014 can follow operation 1012. Operation 1014 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 1002. Operation 1016 can follow operation 1014. Operation 1016 includes providing a portion of the training data to the model 1002. This can include providing the training data in a format usable by the model 1002. The framework 1000 (e.g., via the interface 1004) can cause the model 1002 to produce an output based on the input. Operation 1018 can follow operation 1016. Operation 1018 includes comparing the expected output with the actual output. In an example, this can include applying a loss function to determine the difference between expected and actual. This value can be used to determine how training is progressing. Operation 1020 can follow operation 1018. Operation 1020 includes updating the model 1002 based on the result of the comparison. This can take any of a variety of forms depending on the nature of the model 1002. Where the model 1002 includes weights, the weights can be modified to increase the likelihood that the model 1002 will produce correct output given an input. Depending on the model 1002, backpropagation or other techniques can be used to update the model 1002. Operation 1022 can follow operation 1020. Operation 1022 includes determining whether a stopping criterion has been reached, such as based on the output of the loss function (e.g., actual value or change in value over time). In addition to, or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 1014. If the stopping criterion has been satisfied, the flow can move to operation 1022. Operation 1022 includes deploying the trained model 1002 for use in production, such as providing the trained model 1002 with real-world input data and produce output data used in a real-world process. The model 1002 can be stored in memory 914 of at least one computer 910, or distributed across memories of two or more such computers 910 for production of output data (e.g., predictive data).

Application of Techniques

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for, and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The data flow architecture system described herein demonstrates numbered operational sequences that coordinate information exchange between system components and ensure proper processing of code review requests. The workflow includes operations for pulling changes via API from code repositories, enabling the system to access current code states and modification details that support comprehensive analysis. Post comments via API operations enable the system to deliver generated feedback and recommendations through established development interfaces, ensuring that automated review results integrate seamlessly with existing collaboration and project management tools. Return changelog operations provide automated documentation updates that maintain project records and support compliance with organizational documentation requirements. The numbered sequence approach ensures that complex multi-component workflows maintain proper coordination and state consistency throughout processing cycles, enabling reliable and predictable automated code review operations that support enterprise development environments and organizational standards.

The hierarchical code review system operates through coordinated interactions between multiple specialized components that work together to transform code submissions into comprehensive feedback incorporating multiple layers of organizational standards. The system begins operation when a developer submits code changes through standard development workflows, triggering an automated sequence of analysis operations that traverse organizational hierarchies to identify and apply relevant coding standards. The initial processing stage involves capturing code submission metadata and contextual information that enables the system to determine organizational positioning and scope of applicable standards. The system maintains awareness of project associations, team memberships, and functional domain classifications throughout the processing workflow to ensure that subsequent analysis operations incorporate appropriate organizational context.

The hierarchical position identification process coordinates with knowledge base systems to establish the organizational context for code submissions and determine the scope of applicable standards. The system analyzes code submission characteristics, repository associations, and pipeline configuration data to map submissions to specific positions within the organizational hierarchy. The identification process involves parsing multiple sources of metadata including project identifiers, team assignments, and functional domain classifications that influence the selection and application of coding standards. The system maintains detailed mapping relationships between code submissions and organizational structures, enabling subsequent processing stages to access appropriate standards from multiple hierarchical levels while preserving context about the source and authority of each applied criterion.

The knowledge retrieval operations coordinate between hierarchical knowledge bases and retrieval-augmented generation systems to access and organize applicable coding standards from multiple organizational levels. The retrieval process begins at the most specific organizational level corresponding to the code submission and systematically traverses upward through parent levels to gather comprehensive sets of applicable standards. The system accesses application-specific coding patterns, domain-level compliance requirements, and enterprise-wide security policies through coordinated queries that maintain awareness of hierarchical relationships and inheritance patterns. The retrieval operations involve multiple parallel queries that access different categories of organizational knowledge while maintaining consistency in the application of hierarchical precedence and rule inheritance principles.

The retrieval-augmented generation system coordinates with vector databases to perform sophisticated matching operations between code submission characteristics and stored organizational knowledge. The system generates vector representations of code submissions that capture semantic meaning, structural patterns, and contextual relationships within the submitted code changes. The embedding generation process incorporates multiple aspects of code analysis including programming language syntax, architectural patterns, functional intent, and organizational context to create comprehensive representations that support accurate matching with stored standards. The system performs high-dimensional similarity calculations that identify organizational standards, best practices, and team-specific customizations that align with submitted code characteristics while maintaining awareness of hierarchical positioning and applicability scope.

The context aggregation operations synthesize retrieved knowledge from multiple organizational levels into coherent packages that support comprehensive code review analysis. The aggregation process involves deduplication of overlapping standards, resolution of conflicting requirements, and prioritization of guidance based on organizational hierarchy and specificity levels. The system generates multiple context packages that correspond to different organizational levels, enabling subsequent processing stages to apply hierarchical standards in appropriate sequence and combination. The context aggregation maintains awareness of hierarchical relationships between retrieved knowledge elements, ensuring that context packages preserve organizational structure and inheritance patterns that govern standard application across different levels of the enterprise hierarchy.

The large language model processing coordinates with context aggregation systems to apply retrieved organizational knowledge and generate detailed code review analysis. The language model receives aggregated context packages and processes code submissions against hierarchical standards to produce comprehensive feedback that incorporates requirements from multiple organizational levels and functional domains. The processing operations involve multiple analysis cycles where each cycle focuses on different aspects of the aggregated context, enabling thorough coverage of all applicable organizational requirements. The language model maintains awareness of the hierarchical source of applied standards, enabling the generation of feedback that preserves traceability between review comments and their underlying organizational requirements and policies.

The orchestration engine coordinates the complex workflow of knowledge retrieval, context generation, and feedback production by managing the activities of all system components and ensuring proper sequencing of processing operations. The orchestration process involves iterative cycles where initial analysis results inform subsequent knowledge retrieval operations, enabling the system to refine and enhance review feedback based on emerging insights and identified requirements. The engine maintains state information throughout processing cycles, enabling sophisticated workflow management that preserves context continuity across multiple analysis stages and supports concurrent processing of multiple code review requests. The orchestration operations coordinate timing and resource allocation across different processing components while maintaining consistency in the application of organizational standards and hierarchical precedence rules.

The feedback generation process coordinates between language model outputs and presentation systems to organize review comments according to their hierarchical sources and provide clear attribution to organizational levels. The system generates separate sets of review comments that correspond to different organizational levels, maintaining clear identification of whether feedback originates from application-specific standards, domain-level requirements, or enterprise-wide policies. The feedback organization process involves severity classification, remediation guidance, and references to applicable organizational policies that provide developers with comprehensive context about the source and authority of each recommendation. The system formats generated feedback for integration with existing development workflows while preserving hierarchical organization and maintaining traceability to the organizational standards that contributed to each review comment.

The system coordinates automated documentation generation operations that produce comprehensive changelogs and architectural decision records without requiring developer intervention. The documentation generation process analyzes code modifications in conjunction with applied organizational standards to create structured records that reflect both technical changes and compliance considerations. The system generates documentation that incorporates hierarchical context, indicating which organizational levels contributed standards that influenced code modifications and review recommendations. The automated documentation operations coordinate with version control systems and project management platforms to ensure that generated records integrate seamlessly with existing development workflows and maintain consistency with established documentation practices and organizational requirements.

The integration operations coordinate between automated review systems and existing development infrastructure to ensure seamless operation within established workflows and tool ecosystems. The system maintains compatibility with version control platforms, continuous integration pipelines, and collaboration tools while providing enhanced analysis capabilities that supplement traditional manual review processes. The integration approach enables development teams to adopt automated code review capabilities without requiring extensive modifications to established practices or significant retraining of development personnel. The system coordinates with existing development interfaces to present feedback and recommendations in formats that align with familiar workflows while providing enhanced organizational context and hierarchical attribution that supports improved understanding of applicable standards and requirements.

A number of implementations have been described. Nevertheless, it will be understood that various modifications can be made without departing from the spirit and scope of the disclosure. Accordingly, other implementations are within the scope of the following claims.

The invention claimed is:

1. A computer-implemented method for automated code review, comprising: receiving a code change request associated with a hierarchical organizational structure having multiple organizational levels; identifying a hierarchical position within the organizational structure corresponding to the code change request;

retrieving a plurality of code review rules from a hierarchical knowledge base comprises performing a hybrid retrieval operation, wherein the hybrid retrieval operation comprises executing a dense vector similarity search to identify semantically related rules and executing a sparse keyword-based search to identify specific technical requirements, wherein the hierarchical knowledge base stores code review rules organized according to the hierarchical organizational structure, and wherein the plurality of code review rules includes rules from multiple organizational levels of the hierarchical organizational structure;

applying the plurality of code review rules to the code change request using a large language model to generate code review feedback, wherein the code review feedback identifies the hierarchical level associated with each rule applied; and providing the code review feedback for the code change request.

2. The computer-implemented method of claim 1, wherein identifying the hierarchical position comprises extracting a card identifier from the code change request, and wherein the card identifier corresponds to a specific application within the hierarchical organizational structure.

3. The computer-implemented method of claim 2, wherein the hierarchical organizational structure comprises a digital banking ecosystem having multiple organizational levels including a digital level, a domain level, and an application level.

4. The computer-implemented method of claim 1, wherein retrieving the plurality of code review rules comprises:

starting at a lowest hierarchical level corresponding to the identified hierarchical position;

retrieving code review rules specific to the lowest hierarchical level;

traversing upward through parent levels of the hierarchical organizational structure; and retrieving additional code review rules from each parent level.

5. The computer-implemented method of claim 4, wherein the code review rules from different organizational levels are applied sequentially to generate separate sets of code review comments, and wherein the code review feedback includes an identification of which organizational level generated each code review comment.

6. The computer-implemented method of claim 1, wherein the hierarchical knowledge base is implemented using a retrieval-augmented generation (RAG) system that stores organizational standards, best practices, and team-specific customizations in a vector database organized according to the hierarchical organizational structure.

7. The computer-implemented method of claim 6, wherein applying the plurality of code review rules comprises using an orchestration engine to coordinate multiple interactions with the large language model, wherein each interaction applies code review rules from a different organizational level of the hierarchical organizational structure.

8. The computer-implemented method of claim 2, further comprising:

tracking a token consumption of the large language model during the application of the plurality of code review rules; and allocating a cost of the token consumption to a specific cost center based on the card identifier associated with the code change request.

9. The computer-implemented method of claim 1, wherein retrieving the plurality of code review rules further comprises:

utilizing an orchestration engine to manage multiple interactions with the large language model using a graph-based framework with memory capabilities; and maintaining state information across the multiple interactions to ensure context continuity between the application level rules and the domain level rules.

10. The computer-implemented method of claim 1, further comprising:

automatically generating a changelog entry based on the generated code review feedback and the code change request; and updating a project documentation repository with the changelog entry without manual intervention.

11. The computer-implemented method of claim 1, wherein the hierarchical knowledge base comprises:

an application level storing service-specific coding patterns and Application Programming Interface (API) design guidelines;

a domain level storing payment processing regulations and anti-money laundering requirements; and a digital level storing enterprise-wide security frameworks.

12. The computer-implemented method of claim 1, wherein the hybrid retrieval operation further comprises generating a vector embedding of the code change request, and wherein the dense vector similarity search identifies code review rules having vector representations similar to the vector embedding of the code change request.

\* \* \* \* \*